United States Patent
Estrella et al.

(10) Patent No.: US 11,276,157 B2
(45) Date of Patent: Mar. 15, 2022

(54) SYSTEMS AND METHODS FOR AUTOMATED VIDEO ANALYSIS DETECTION TECHNIQUES FOR SUBSTRATE PROCESS

(71) Applicant: Tokyo Electron Limited, Tokyo (JP)

(72) Inventors: Joel Estrella, Austin, TX (US); Michael Carcasi, Austin, TX (US); Joshua Hooge, Austin, TX (US)

(73) Assignee: TOKYO ELECTRON LIMITED, Tokyo (JP)

( * ) Notice: Subject to any disclaimer, the term of this patent is extended or adjusted under 35 U.S.C. 154(b) by 0 days.

(21) Appl. No.: 17/037,094

(22) Filed: Sep. 29, 2020

(65) Prior Publication Data

US 2021/0150697 A1 May 20, 2021

Related U.S. Application Data

(60) Provisional application No. 62/935,162, filed on Nov. 14, 2019.

(51) Int. Cl.
  *G06T 7/00* (2017.01)
  *G06T 7/20* (2017.01)
  (Continued)

(52) U.S. Cl.
  CPC .............. *G06T 7/0004* (2013.01); *G06T 7/20* (2013.01); *G06T 7/70* (2017.01); *G06T 7/90* (2017.01);
  (Continued)

(58) Field of Classification Search
  None
  See application file for complete search history.

(56) References Cited

U.S. PATENT DOCUMENTS

| 6,493,078 B1 | 12/2002 | Fitzsimmons |
| 6,680,078 B2 | 1/2004 | Davlin |
(Continued)

FOREIGN PATENT DOCUMENTS

| JP | 2000082646 A | 3/2000 |
| JP | 2017090232 A | 5/2017 |
(Continued)

OTHER PUBLICATIONS

U.S. Appl. No. 17/341,105, filed Jun. 7, 2021.
(Continued)

*Primary Examiner* — Delomia L Gilliard
(74) *Attorney, Agent, or Firm* — Slater Matsil, LLP

(57) ABSTRACT

Camera images are utilized to provide information regarding characteristics of in a fluid dispense system. Camera images may be utilized to identify the movement of the hardware of a fluid dispense system. The movement of the hardware may be utilized to determine the beginning of a fluid dispense based upon a correlation between the hardware movement and a dispense time provided in a dispense recipe. The beginning of the fluid dispense may be detected by performing an image analysis on the camera images to detect the presence of the fluid in the camera image. The image analysis may involve an intensity analysis of the detected camera image. In another embodiment, the camera image is utilized to detect the edges of the fluid formed on substrate. The edges may be detected as a puddle formed prior to spinning the substrate and/or may be detected as the puddle spreads during spinning.

19 Claims, 10 Drawing Sheets

(51) Int. Cl.
    *G06T 7/70*       (2017.01)
    *G06T 7/90*       (2017.01)

(52) U.S. Cl.
    CPC ...... *G06T 7/97* (2017.01); *G06T 2207/10016* (2013.01); *G06T 2207/10024* (2013.01); *G06T 2207/30164* (2013.01)

(56) References Cited

U.S. PATENT DOCUMENTS

| | | | |
|---|---|---|---|
| 6,693,708 | B1 | 2/2004 | Hunter |
| 6,707,545 | B1 | 3/2004 | Hunter |
| 6,721,045 | B1 | 4/2004 | Hunter |
| 6,818,064 | B2 | 11/2004 | Baker |
| 7,012,684 | B1 | 3/2006 | Hunter |
| 7,485,188 | B2 | 2/2009 | Takekuma |
| 7,670,643 | B2 | 3/2010 | Winter |
| 9,786,523 | B2 | 10/2017 | Fonseca et al. |
| 2004/0072450 | A1 | 4/2004 | Collins |
| 2007/0251450 | A1 | 11/2007 | Lin |
| 2017/0128978 | A1* | 5/2017 | Okita ............ B05D 1/02 |
| 2018/0323085 | A1 | 11/2018 | Sano |
| 2019/0217325 | A1 | 7/2019 | Devilliers |
| 2019/0217326 | A1 | 7/2019 | Devilliers |
| 2019/0244345 | A1* | 8/2019 | Haga ............ B01L 3/5085 |
| 2019/0287793 | A1 | 9/2019 | Devilliers |

FOREIGN PATENT DOCUMENTS

| | | |
|---|---|---|
| KR | 100989857 B1 * | 10/2010 |
| KR | 100989857 B1 | 10/2010 |
| KR | 20160112240 A | 9/2016 |
| WO | 0229390 W | 4/2002 |

OTHER PUBLICATIONS

U.S. Appl. No. 17/037,131, filed Sep. 29, 2020.
U.S. Appl. No. 17/037,142, filed Sep. 29, 2020.
U.S. Appl. No. 17/037,007, filed May 6, 2021.
U.S. Appl. No. 17/349,538, filed Jun. 16, 2021.
U.S. Appl. No. 17/037,111, filed Sep. 29, 2020.
U.S. Appl. No. 17/037,117, filed Sep. 29, 2020.
U.S. Appl. No. 17/192,520, filed Mar. 4, 2021.
PCT International Search Report and Written Opinion in counterpart PCT application PCT/US2020/053371, dated Jan. 15, 2021, 10 pages.

* cited by examiner

SYSTEMS AND METHODS FOR AUTOMATED VIDEO ANALYSIS DETECTION TECHNIQUES FOR SUBSTRATE PROCESS

This application claims priority to U.S. Provisional Patent Application No. 62/935,162, entitled, "Systems and Methods for Automated Video Analysis Detection Techniques for Substrate Process," filed Nov. 14, 2019; the disclosure of which is expressly incorporated herein, in its entirety, by reference.

BACKGROUND

The present disclosure relates to the processing of substrates. In particular, it provides a novel system and method for monitoring one or more characteristics of a substrate processing step. In one embodiment, the system and method disclosed herein may be utilized when processing semiconductor substrates.

Traditional substrate processing systems utilize photolithography processes, which include photoresist coating, exposure, photoresist develop, and various bake steps. The materials and processes utilized in these steps may all impact film thickness, critical dimension targeting, line roughness, uniformity, etc. on a substrate. As geometries in substrate processing continue to shrink, the technical challenges to forming structures on substrates increase. These processes utilized fluid dispense systems at various photolithography process steps. Fluid dispense systems may also be utilized to apply fluids and/or form coatings at other process steps in a substrate processing flow.

Gross processing equipment excursions or faults such as equipment breakdowns, material drips, improper arm movements, etc. in fluid dispense systems are known to be monitored. One approach for monitoring gross processing issues in coating modules has been the inclusion of a camera in a coating module of a processing system. For example, coating modules have included spin module monitor (SMM) cameras which can be used to identify drips of the material being coated, improper dispense arm movements, etc. Images from the SMM camera may be analyzed after processing to determine if a substrate was subjected to such process excursions or faults.

SUMMARY

Various embodiments of systems and methods for monitoring one or more characteristics of a substrate are disclosed herein. More specifically, the present disclosure provides various embodiments of utilizing camera images to provide information regarding characteristics of a fluid dispense system. In one embodiment, camera images are utilized to determine the movement of a hardware apparatus of a fluid dispense system. In one embodiment, the movement of the hardware apparatus may be utilized to determine the beginning of the dispense of fluid based upon a correlation between the hardware movement and a dispense time provided in a dispense recipe. In another embodiment, the beginning of the dispense of the fluid may be detected by performing an image analysis on the camera images to detect the presence of the fluid in the camera image. In one embodiment, the image analysis involves an intensity analysis of the detected camera image. In another embodiment, the camera image is utilized to detect the edges of the fluid formed on substrate. The edges may be detected as a puddle formed prior to spinning the substrate and/or may be detected as the puddle spreads during spinning.

According to one embodiment, a method of monitoring one or more characteristics of a fluid dispense system is provided. The method comprises providing a substrate within the fluid dispense system and using a camera to obtain a plurality of camera images within the fluid dispense system. The method further comprises determining a first location of a hardware apparatus of the fluid dispense system from at least a first camera image and detecting movement of the hardware apparatus from the plurality of camera images. The method then comprises utilizing information regarding the detected movement of the hardware apparatus to determine a condition of a dispense process of the fluid dispense system.

The method may also additionally comprise determining a second location of the hardware apparatus of the fluid dispense system from at least a second camera image. In one embodiment, the plurality of camera images are provided from a video obtained by the camera. In another embodiment, the condition of the dispense process is indicative of a dispense start time. In one example, the information regarding the detected movement of the hardware apparatus indicates that the hardware apparatus has stopped moving. In a particular embodiment, the dispense time is determined by a predetermined time between the hardware apparatus stopping movement and a fluid dispense beginning. In some embodiments, the hardware apparatus is an arm, a nozzle holder, and/or a nozzle.

According to another exemplary method embodiment, a method of monitoring one or more characteristics of a fluid dispense system is provided. The method may comprise providing a substrate within the fluid dispense system, using a camera to obtain a plurality of camera images within the fluid dispense system, and determining a beginning of a dispense of fluid utilizing the plurality of camera images. The determining step of the method may be performed by alternative embodiments. In one embodiment, the determining is performed by identifying in at least one of the plurality of camera images a presence of the fluid. In a specific example, the presence of the fluid is detected based on an intensity analysis of the plurality of camera images. The intensity analysis may be performed upon a predetermined set of pixels of the plurality of camera images. In some approaches, the intensity analysis utilizes a ratio of multiple color spectrums. For example, the ratio of multiple color spectrums may be calculated from two of a red color spectrum, a blue color spectrum, and a green color spectrum. In an alternative embodiment for determining the beginning of the dispense, the determining is performed by analyzing movement of a hardware apparatus of the fluid dispense system. This approach may further include the determining be performed by analyzing intensity changes over time within a plurality camera images (in one embodiment preferably making use of a predetermined set of pixels). An alternative approach uses both hardware movement and the analysis of the presence of fluid. Specifically, the determining a beginning of a dispense of fluid utilizing the plurality of camera images may be performed both by identifying in at least one of the plurality of camera images a presence of the fluid based on an intensity analysis of the plurality of camera images and by analyzing movement of a hardware apparatus of the fluid dispense system.

In yet another embodiment of the techniques described herein, a method of monitoring one or more characteristics of a fluid dispense system is provided. The method may include providing a substrate within the fluid dispense system, forming a liquid puddle on the substrate, obtaining a camera image of the puddle formed on the substrate, and identifying edges of the puddle from the camera image of the puddle. In one embodiment of this method, the camera image of the puddle is obtained before the substrate spins. Another embodiment further comprises obtaining a plurality of camera images of the puddle formed on the substrate. In one embodiment, at least one of the plurality of camera images of the puddle is obtained while the substrate is spinning. In one embodiment, the edges of the puddle are determined based on an intensity analysis of the camera image. In yet another embodiment, the intensity analysis is performed on a subset of pixels of the camera image. In some examples, a number of pixels that correspond to fluid coverage is determined. The intensity analysis may be performed on a plurality of camera images. In some cases, a fluid coverage rate of change is obtained.

In still another embodiment, a method of monitoring one or more characteristics of a fluid dispense system is disclosed. The method may comprise providing a substrate within the fluid dispense system, using a camera to obtain a plurality of camera images within the fluid dispense system, and determining a spin speed of the substrate at a time of one or more of the plurality of camera images and affiliating the spin speed with the one or more of the plurality of camera images. In one embodiment of this method the spin speed of the substrate is determined from the plurality of camera images. In a specific embodiment, the spin speed of the substrate is determined by utilizing the plurality of camera images to detect a rotation of a pattern on the substrate. In more particular approach, an intensity difference between the plurality of camera images is utilized to detect the rotation of the pattern on the substrate. In another embodiment, a predetermined set of pixels are chosen for detection of the rotation of the pattern on the substrate. In still another alternative approach, the spin speed of the substrate is determined from data from a spin motor. In one example, the data from the spin motor may be incorporated into the plurality of camera images. In a more particular embodiment, the data from the spin motor is incorporated into the plurality of camera images by inclusion of a representation of the data from the spin motor in a field of view of the camera image. In an alternative embodiment, the data from the spin motor is incorporated into the plurality of camera images by interlacing the data from the spin motor into the plurality of camera images.

BRIEF DESCRIPTION OF THE DRAWINGS

A more complete understanding of the present inventions and advantages thereof may be acquired by referring to the following description taken in conjunction with the accompanying drawings, in which like reference numbers indicate like features. It is to be noted, however, that the accompanying drawings illustrate only exemplary embodiments of the disclosed concepts and are therefore not to be considered limiting of the scope, for the disclosed concepts may admit to other equally effective embodiments.

DETAILED DESCRIPTION

The techniques described herein may be utilized within a wide variety of fluid dispense systems. For example, an exemplary fluid dispense system may be utilized for various fluid dispense purposes (such as, for example, a resist coating unit, a resist developing unit, or other spin coating units) within which fluid are applied to a substrate for processing purposes. It is recognized that the fluid dispense systems shown herein are merely exemplary embodiments of a processing system within which the monitoring techniques described herein may be applied. Thus, the techniques disclosed herein may be applied to other fluid dispense systems and/or other processing units. Moreover, these fluid dispense systems may be stand-alone units or more be integrated in a larger systems. For example, the fluid dispense systems described herein may be integrated within larger systems that include coating, developing, baking, inspection, exposure, etc. modules.

Figure 1:
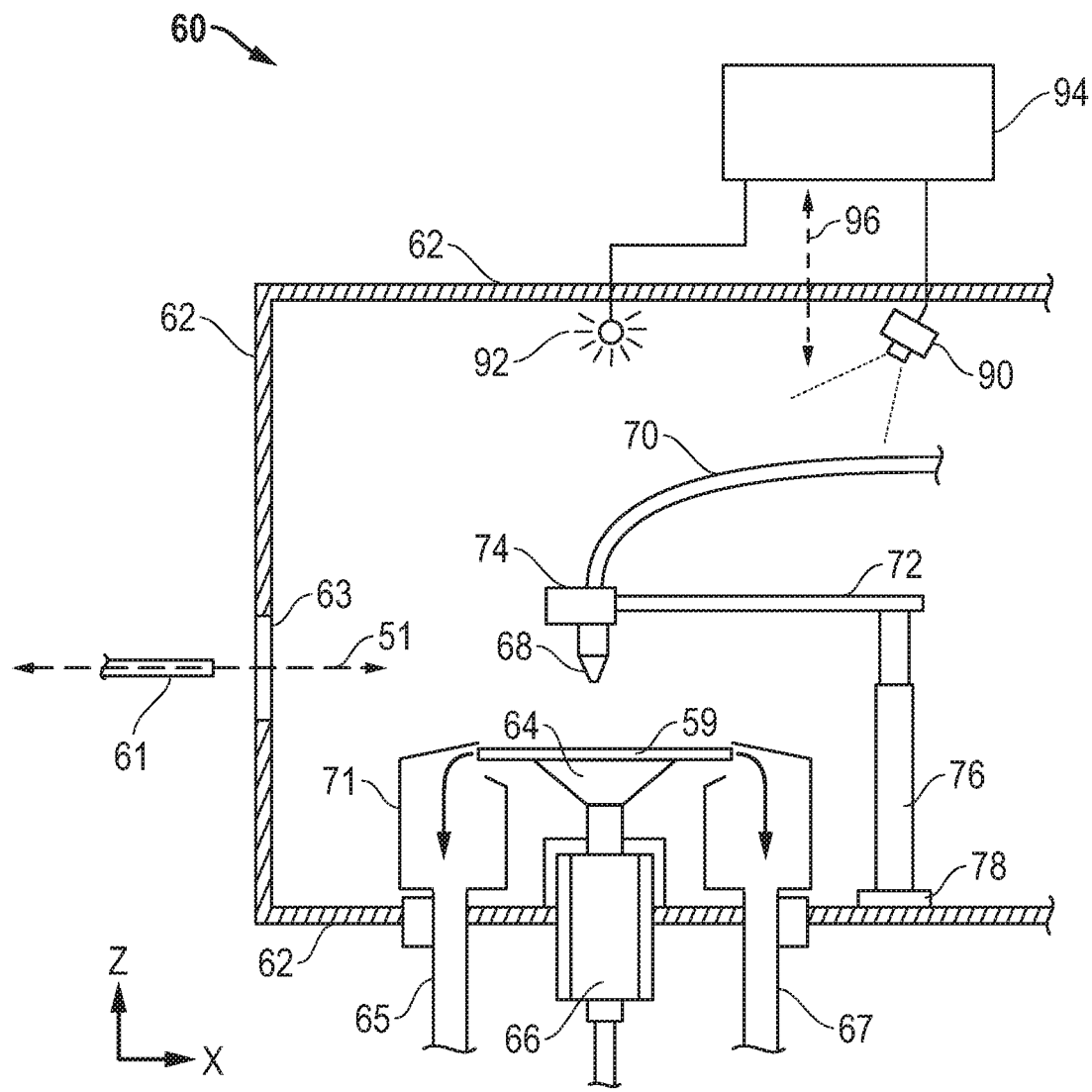
FIG. 1 is an exemplary fluid dispense system.

The fluid dispense systems described herein may be utilized to subject substrates to a wide variety of processing liquids, which may be part of, for example, resist coating unit, a developing unit or other fluid dispense systems (such as for example, spin-on hard mask units, spin-on antireflective coating units, etc.). As shown in FIG. 1, a fluid dispense system 60 includes a processing chamber, which is bounded by a chamber walls 62. A spin chuck 64 disposed inside chamber walls 62 provides support for a substrate, which may in some embodiments, be a semiconductor wafer (W). More specifically, the spin chuck 64 has a horizontal upper surface on which the substrate is supported during processing. A suction port (not shown) may be provided in the horizontal upper surface of spin chuck 64 for securing the substrate to the spin chuck with suction. The spin chuck 64, and the substrate supported by the spin chuck 64, may be rotated at a variable angular velocity by a drive mechanism 66, which may be a stepper motor, etc. The drive mechanism 66 may operate at various angular velocities for the application of the liquid material and flow of the liquid material onto the substrate.

A nozzle 68 is adapted to dispense one or more liquid solutions onto the substrate at a specified rate to apply one or more layers or films onto an upper surface of the substrate. Typical layers or films that may be applied to the substrate surface include, but are not limited to, imaging layers (e.g., photoresist), develop solutions, topcoat (TC) barrier layers, topcoat antireflective (TARC) layers, bottom antireflective (BARC) layers, sacrificial and barrier layers (hard mask) for etch stopping, etc. The nozzle 68 is coupled to a liquid supply unit (not shown) through a liquid supply line 70. In some embodiments, nozzle 68 may be attached to the leading end of a nozzle scan arm 72 through a nozzle holder 74. The nozzle scan arm 72 is mounted at the upper end portion of a vertical support member 76 that is horizontally movable on a guide rail 78 in one direction (e.g., in the Y-direction). Although not shown in the figure, a drive mechanism (not shown) may be coupled to the nozzle scan arm 72, the vertical support member 76 or the guide rail 78 to move the nozzle 68 in the Y-direction. Other mechanisms (also not shown) can be used to move the nozzle 68 in the Z-direction and/or in the X-direction. It will be recognized that the particular dispense and arm mechanisms and movements described herein are merely exemplary as a wide variety of dispense techniques are well known in the art.

A cup 71 is provided to capture and collect a majority of the liquid material ejected from the substrate by centrifugal forces generated during rotation by the spin chuck 64. The spin chuck 64 supports and rotates (i.e., spins) the substrate about its central normal axis relative to the cup 71, which is stationary. Liquid material ejected from the substrate 59 and collected by the cup 71 is drained via a drain line 65 and drain unit (not shown). In some embodiments, an exhaust line 67 and exhaust unit (not shown), such as a vacuum pump or other negative pressure-generating device, may also be used to remove gaseous species (including but not limited to vapors released from substrate layers during processing) from the processing space inside the cup 71.

Spin chuck 64 and drive mechanism 66 are disposed within an opening in the cup 71. In some embodiments, an elevation mechanism, such as an air cylinder and an up-and-down guide unit, may be provided within drive mechanism 66 so the spin chuck 64 may move vertically relative to the chamber walls 62. The substrate can be delivered to the spin chuck 64 by a processing arm 61 through a loading/unloading opening 63 of fluid dispense system 60 in a direction 51 as shown in FIG. 1. The processing arm 61 may form a part of the fluid dispense system 60 or may be part of a separate substrate transfer mechanism (not shown) for interacting with other process equipment. In some embodiments, the processing arm 61 may be included within the main arm mechanism of a larger system for transferring substrates between various process modules of the larger system. In other embodiments, the processing arm 61 may be included within other substrate processing systems. In some embodiments, the elevation mechanism can lift the drive mechanism 66 and/or the spin chuck 64 upwards to receive a substrate. Alternatively, the cup 71 may be configured to move up-and-down, or may be configured to separate and widen, to allow a substrate to be placed on the spin chuck 64.

It is noted that the fluid dispense system 60 shown in FIG. 1 is merely one example processing system in which the monitoring techniques described herein may be used. Thus, the fluid dispense system 60 is not meant to be limiting, but rather merely representative of one example processing system within which the monitoring techniques described herein may be utilized. Further, though the fluid dispense system 60 is described with reference to a system for processing substrates, which may in some embodiments be semiconductor wafers, it will be recognized that the techniques described herein may be utilized when processing other types of substrates. Thus, it will be recognized that the monitoring techniques described herein may be utilized within a wide range of substrate processing systems that apply liquid solutions to substrates.

Figure 2:
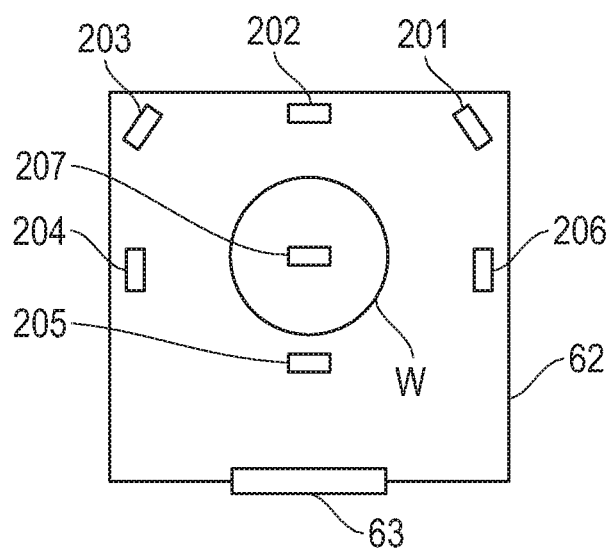
FIG. 2 illustrates exemplary camera locations for the fluid dispense system of FIG. 1.
Figure 3:
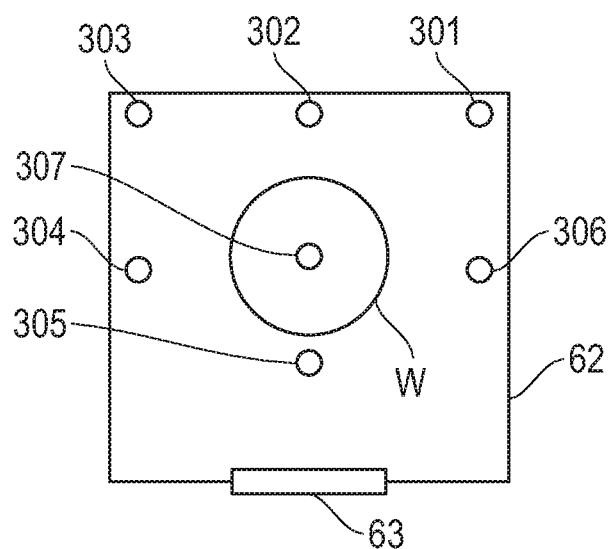
FIG. 3 illustrates exemplary light locations for the fluid dispense system of FIG. 1

The fluid dispense system 60 also includes a light source 92 and a camera 90 as shown in FIG. 1. As used herein, "camera" may refer to simply a camera or may be a more complex system that includes a camera and other electronics. The camera 90 may be utilized to monitor the fluid dispense and coating process as described in more detail herein below. The locations of the light source 92 and camera 90 shown in FIG. 1 are merely exemplary and a wide variety of other positions may equally be utilized to allow the camera 90 to monitor the condition of the substrate surface. FIGS. 2 and 3 provide a simplified top view (excluding many of the details of FIG. 1) of the fluid dispense system 60 so as to better illustrate exemplary locations of the camera 90 and light source 92. It will be recognized, however, that these locations are merely exemplary and other locations may be utilized. As shown in FIGS. 2 and 3 the substrate 59 is provided within the chamber walls 62 of the processing chamber which has a loading/unloading opening 63. FIG. 2 illustrates exemplary locations for locating the camera 90 in the upper regions of the process chamber above the substrate. More specifically, FIG. 2 illustrates exemplary camera locations 201, 202, 203, 204, 205, 206, and 207 for locating the camera 90. FIG. 3 illustrates exemplary locations for locating the light source 92 in the upper regions of the process chamber above the substrate. More specifically, FIG. 3 illustrates exemplary light source locations 301, 302, 303, 304, 305, 306 and 307 for locating the light source 92. Again it will be recognized that such locations of the camera and light source are merely exemplary and other locations may be utilized.

The techniques described herein are not limited to a particular camera and light source type. The camera may be any of wide variety of types of cameras designed to capture and/or store data from an image. The cameras may collect still images and/or video images. A wide variety of cameras may be utilized, including but not limited to, charged coupled device (CCD) image sensor cameras, complementary metal oxide semiconductor (CMOS) image sensor cameras, N-type metal-oxide-semiconductor (NMOS) image sensor cameras, indium gallium arsenide (InGaAs) image sensor cameras, indium antimony (InSb) image sensor cameras, etc. The light source may typically be a light source of the visible spectrum or longer. For example, light sources in the visible spectrum, near-infrared (NIR), shortwave-infrared (SWIR) and mid-infrared (MIR) are exemplary light sources. In one embodiment, an amber light source in the visible spectrum may be utilized. In another embodiment, an infrared (IR) light source is utilized. In yet other embodiments, a multi-spectrum light source may be utilized. It will be recognized that many cameras may include integrated filters that block the IR spectrum. The use of such filters may be undesirable if the IR spectrum is desired for analysis.

As mentioned above, monitoring of a wide range of variables and conditions of the fluid dispense process may be achieved through the utilization of a camera in the fluid dispense system. Various monitoring techniques are described below. It will be recognized that these techniques need not be utilized together but rather may be utilized individually. Alternatively, some or all of the techniques may be combined for more thorough monitoring.

Coupled to (or even part of) the fluid dispense system 60 as shown of FIG. 1 may be a controller 94 for setting and controller various process operation parameters of the system. The controller 94 may be coupled to the camera 90 and light source 92 as shown. The controller 94 may also be coupled as indicated by signal line 96 to any or all of a number of the components of the fluid dispense system 60 to receive information from and/or to control the components. For example the controller 94 may receive information from and provide control information to the camera 90, processing arm 61, spin chuck 64, drive mechanism 66, nozzle 68, nozzle scan arm 72, etc. The controller 94 may also be generally configured to analyze various data collected by the fluid dispense system, and in some cases provide feedback control to various process operation parameters. Thus, the techniques for data processing and system control described herein may be implemented by a controller 94. It is noted that the controller(s) 94 described herein can be implemented in a wide variety of manners. In one example, the controller may be a computer. In another example, controller 94 may include one or more programmable integrated circuits that are programmed to provide the functionality described herein. For example, one or more processors (e.g., microprocessor, microcontroller, central processing unit, etc.), programmable logic devices (e.g., complex programmable logic device (CPLD)), field programmable gate array (FPGA), etc.), and/or other programmable integrated circuits can be programmed with software or other programming instructions to implement the functionality described herein for controller 94. It is further noted that the software or other programming instructions can be stored in one or more non-transitory computer-readable mediums (e.g., memory storage devices, flash memory, dynamic random access memory (DRAM), reprogrammable storage devices, hard drives, floppy disks, DVDs, CD-ROMs, etc.), and the software or other programming instructions when executed by the programmable integrated circuits cause the programmable integrated circuits to perform the processes, functions, and/or capabilities described herein. Other variations could also be implemented. It is noted that though the controller 94 is shown as part of the fluid dispense system 60, in alternate embodiments, the controller 94 may be separate from the fluid dispense system 60.

The analysis of a fluid dispense process with a camera may include a wide range of techniques of analyzing and processing the images obtained of the fluid dispense process. Such techniques may include analyzing still images and/or analyzing video images obtained from the camera. The monitoring of fluid dispense processes and the image obtained may be utilized for real time analysis/control and/or post process analysis. This image analysis may provide hardware and process feedback that may otherwise not be available and can lead to improvements and optimization. Image recording is an efficient method of data collection that can be done for every substrate. The image analysis can be used to determine and/or control a variety of variables including film thicknesses, critical dimensions, film uniformity, etc. In order to efficiently and accurately analyze images collected, automated techniques may be desirable.

Both real time and post process analysis may benefit from the use of automated techniques. For real time analysis, automated techniques may be required, in order to efficiently process data as needed. Based on the large amount of data available, these automated techniques also benefit the analysis that needs to be done post process.

Hardware Movement and Dispense Detection

Independent of what analysis is being done (monitoring a film thickness on a substrate, monitoring uniformity during a spin coating process, monitoring the amount of fluid dispensed, monitoring a fluid puddle spread on a substrate, etc.), certain events in the fluid dispense process may be desirable to detect. For example, it may be desirable to detect certain hardware movement during the process. In one embodiment, detection of the movement of the dispense hardware (for example a dispense arm and/or nozzle) may be desirable. It may also be desirable to detect when the fluid dispense from the nozzle occurs. In yet another embodiment, it may be desirable to detect the edge of the fluid dispense formed on the substrate. All of these data points may be beneficial for use in other analysis algorithms and techniques which provide an overall image based analysis and/or control of the dispense process (such as film thickness, film uniformity control, critical dimension control, etc.) Thus, the automatic detection of variables such as hardware movement, dispense start and dispense edge using image analysis may provide valuable data points for monitoring and controlling a substrate process flow.

The detection of the hardware movement may be used to assist in one method of detecting the time frame in which a dispense starts. Thus, for example, by detecting hardware arm and/or nozzle movements the start time of the dispense itself may be inferred. This data may be collected and used in various process monitoring and and/or control techniques, for example by the controller 94 or other controllers and/or processors. Further, some recipes may consist of multiple dispense processes that occur on the substrate. The hardware movement may in such cases include additional movements that are detected which correlate to the additional dispense.

As mentioned above, the arm of the dispense hardware may be equipped with one or more nozzles that are used to dispense fluid on the substrate. For each video or set of camera images, typical arm movements may consist of the arm moving into view over the substrate, the arm moving down towards the substrate, the arm moving horizontally (if a second dispense occurs), and the arm moving out of view away from the substrate. The occurrence of such movements may be correlated to the beginning of a dispense process. Also, the occurrence of such movements may be used to greatly reduce the plausible images in which a dispense start may occur if the images are to be analyzed for the presence of the dispensed fluid. It will be recognized that the arm movements are merely exemplary and the movement of other dispense hardware may similarly be tracked. For example, an arm could be stationary and only a nozzle may move. Alternatively, multiple hardware components may move together and/or separately.

Figure 4A:
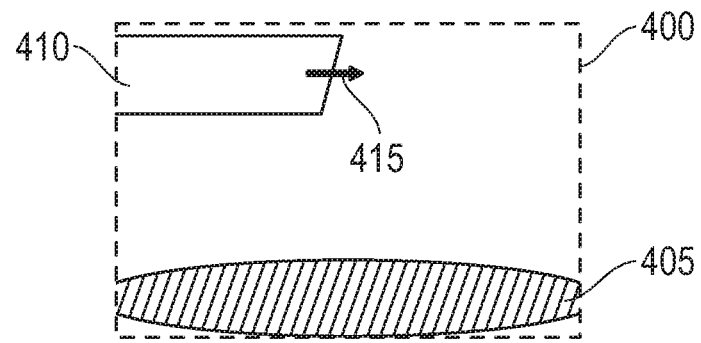
FIGS. 4A-4E illustrate camera fields of view having exemplary hardware movement.
Figure 4B:
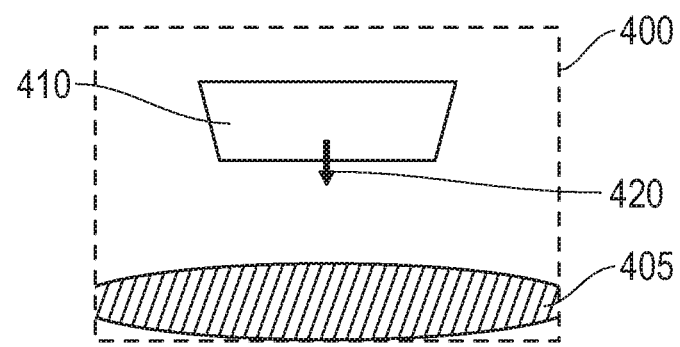
Figure 4C:
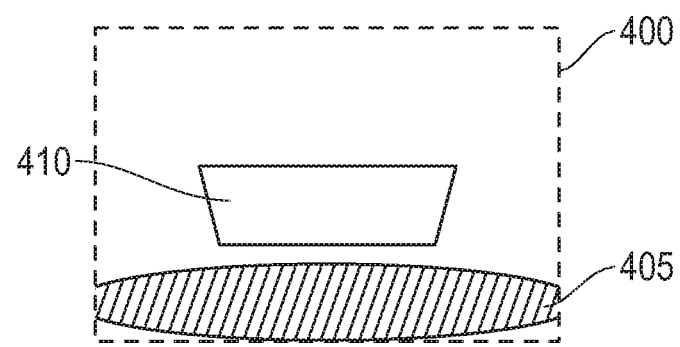
Figure 4D:
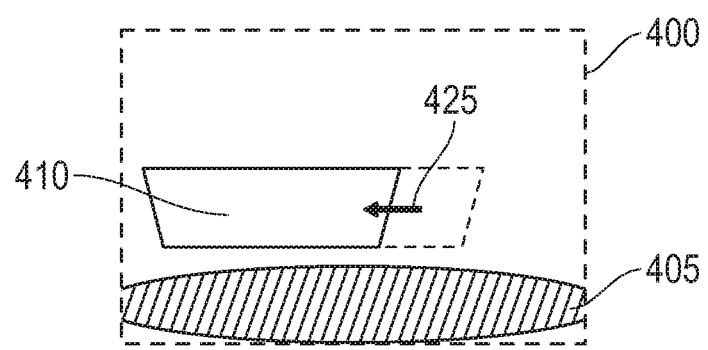
Figure 4E:
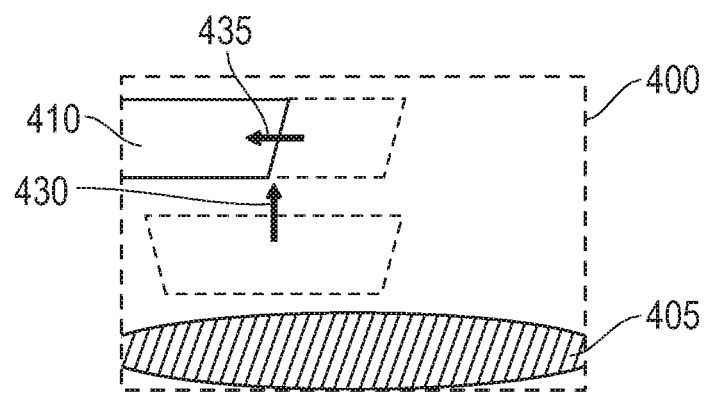
Figure 4H:
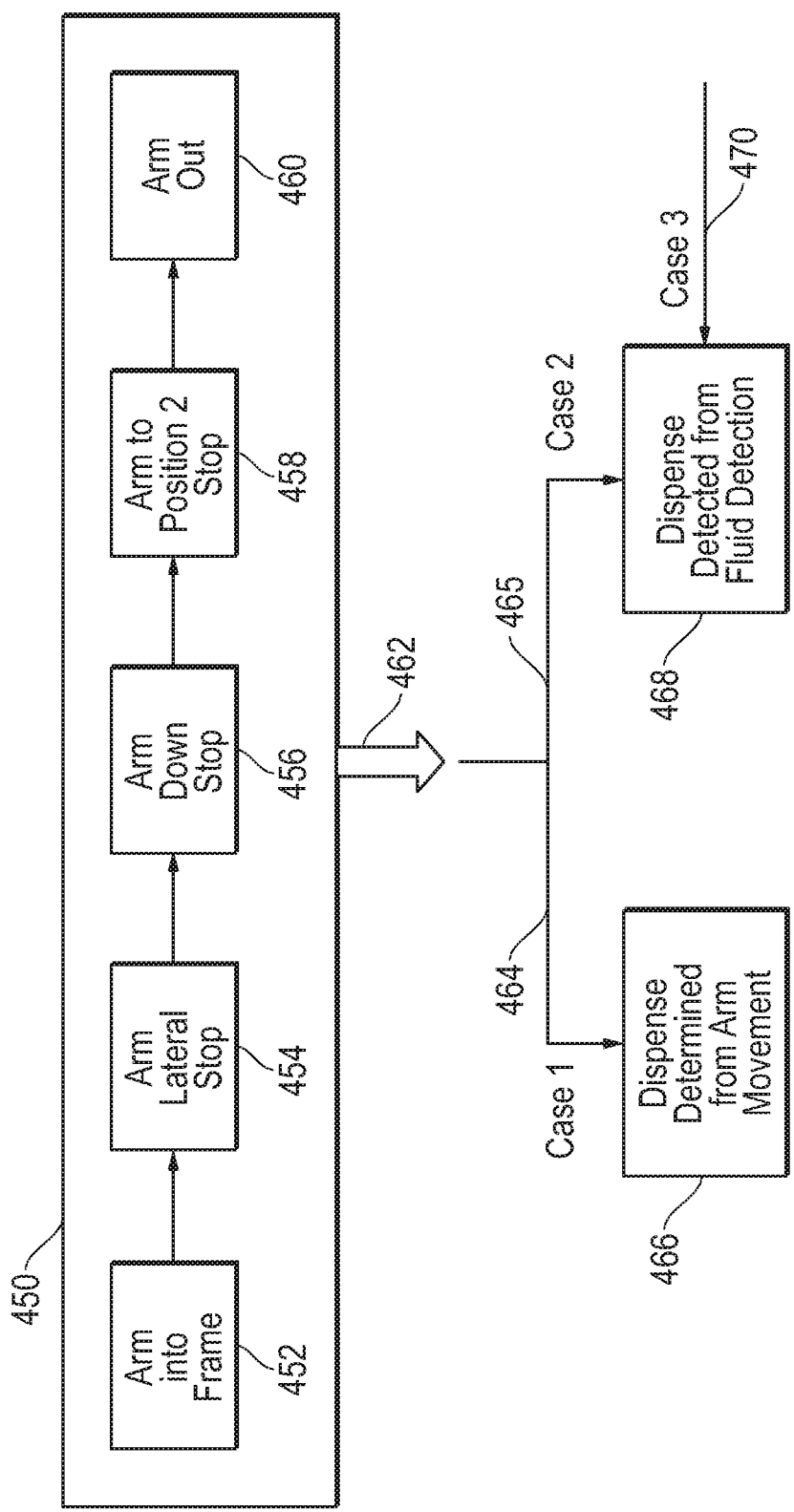
FIGS. 4F-4G illustrate an exemplary workflow illustrating various potential ways that the detection analysis may proceed.

FIGS. 4A-4E illustrate an exemplary hardware movement associated with a dispense process. As shown in these figures, an image of a field of view 400 of a camera 90 of a fluid dispense system 60 is illustrated. In FIGS. 4A-4E, a dispense hardware apparatus 410 and a substrate 405 are shown. The dispense hardware apparatus may be any type of hardware that moves in association with a dispense process. For example, the dispense hardware apparatus 410 may be one or more of the nozzle scan arm 72, the nozzle holder 74 and/or the nozzle 68 of FIG. 1. As mentioned, however, these hardware elements are merely exemplary and the hardware for which motion is detected may be other hardware of the fluid dispense system 60. FIG. 4A illustrates an image of the field of view 400 when the dispense hardware apparatus 410 first enters the field of view due to movement in the direction of arrow 415. FIG. 4B illustrates an image of the field of view 400 when the dispense hardware apparatus 410 is above the substrate 405 while the dispense hardware apparatus 410 is moving downward in the direction of arrow 420. FIG. 4C illustrates an image of the field of view 400 when the dispense hardware apparatus 410 completes the downward movement. At this point a first dispense of fluid on to the substrate 405 may occur. FIG. 4D illustrates an image of the field of view 400 when the dispense hardware apparatus 410 moves sideways in a direction of arrow 425, for example a movement that may be associated with a second dispense of fluid on the substrate 405. FIG. 4E illustrates an image of the field of view 400 when the dispensing of fluid has completed and the dispense hardware apparatus 410 moves upward and away from the substrate 405 as shown by arrows 430 and 435.

Movements of the dispense hardware apparatus may be collected by the camera 90 and the associated camera images (still or video) may be provided to the controller 94 (or other controllers or processors) for analysis. The analysis may include detecting the particular motion and position of the dispense hardware apparatus by analyzing intensity differences between differences between a plurality of images (such as the image shown in FIGS. 4A-4C). A wide range of image frame and data processing techniques may be applied to the images to determine where the dispense hardware apparatus 410 is at a particular point in time and/or what the associated motion is at a particular point in time. One such technique may include analyzing intensity differences across image frames. Further, moving averages may be applied to the data to more easily find peaks in the data. The analysis may include an analysis of the whole image frame or only an analysis of a subset of pixels of the image frame (for example pixels in which the dispense hardware apparatus is expected to be present during the actual dispense of fluid).

The movement of the hardware within the fluid dispense system may be utilized for a variety of analysis techniques. In one embodiment automated detection of a dispense start may be based on (1) detection of one or more movement detection steps of the dispense hardware and (2) the correlation to those steps to the actual dispense in accordance with times set within a dispense recipe. Thus, the first movement detected is the arm moving into the field of view and over the substrate. The detection of the arm moving downwards toward the substrate is next detected. Once the start of the arm moving downwards is detected and monitored, it may be determined when the arm stops moving downwards and prepares to dispense on the wafer. These movements may be detected based on analyzing the intensity changes over time across the field of view for each image frame and prior knowledge as to what the image intensity of the arm is in the image frame. Once the end of the downward movement towards the substrate occurs, the time of dispense may be determined by the settings of the process recipe (for example a particular known delay from the movement completion to the fluid flow).

Another method of detecting the dispense start, may involve a direct analysis of different color spectrums that are presented on the camera image as a result of the presence of the fluid that is being dispensed. Such color spectrums may be detected on the substrate or may be detected between the nozzle and the substrate. Thus image analysis that may be used to automatically determine the dispense start may involve an intensity analysis of color spectrums present in the image that result from the dispensed fluid changing the spectrums present in the image. In one approach, an intensity analysis of a ratio of multiple color spectrums is utilized. In one embodiment, a set of pixels may be first chosen to be used for the intensity analysis and then those pixels may be used to identify the frame in which the dispense starts. For this set of pixels, a ratio is calculated from two of the three available color spectrums (the red, green and blue spectrums). The ratio is calculated for each frame in the camera image. A frame by frame intensity difference is then calculated for each previously calculated ratio. The frame in which the dispense starts is then identified by determining the maximum intensity difference between frames. The color spectrum ratio technique is just one method of using the presence of the fluid in the actual camera image to detect the dispense start and it will be recognized that other image processing techniques may be utilized.

For either the arm movement detection technique or the direct detection of the fluid in the image technique (for example using the color spectrum ratio technique), a predetermined set of pixels may be used to identify the detection. For example, the pixels within which movement of the arm would be expected to occur or the pixels in which the dispensed fluid would be expected to be within may be chosen. A set of frames and pixels within a frame to be analyzed may then be determined based on which detection technique is utilized. For example, the frame at which detection occurs may then be found by finding the maximum intensity change within this set of frames using the set of pixels previously determined. For the arm movement technique, the particular frame that is set to be the dispense beginning frame may be based on a set amount of time after the end of the downward movement based on the recipe. For the direct fluid detection technique, the dispense frame may be the particular frame in which an anticipated color spectrum (or change of the color spectrum) is detected. It is noted that the two techniques may further be used in combination. For example, arm movement may monitored and then a set of frames immediately after the end of the downward movement may be used to look for color spectrum changes.

As noted, some fluid dispense recipes may consist of multiple dispense processes that occur on the substrate. These multiple dispenses may also be accounted for in the detection process, by detecting multiple dispenses from color spectrum analysis or additional arm movements (if additional arm movements are associated with the multiple dispense events).

Figure 4G:
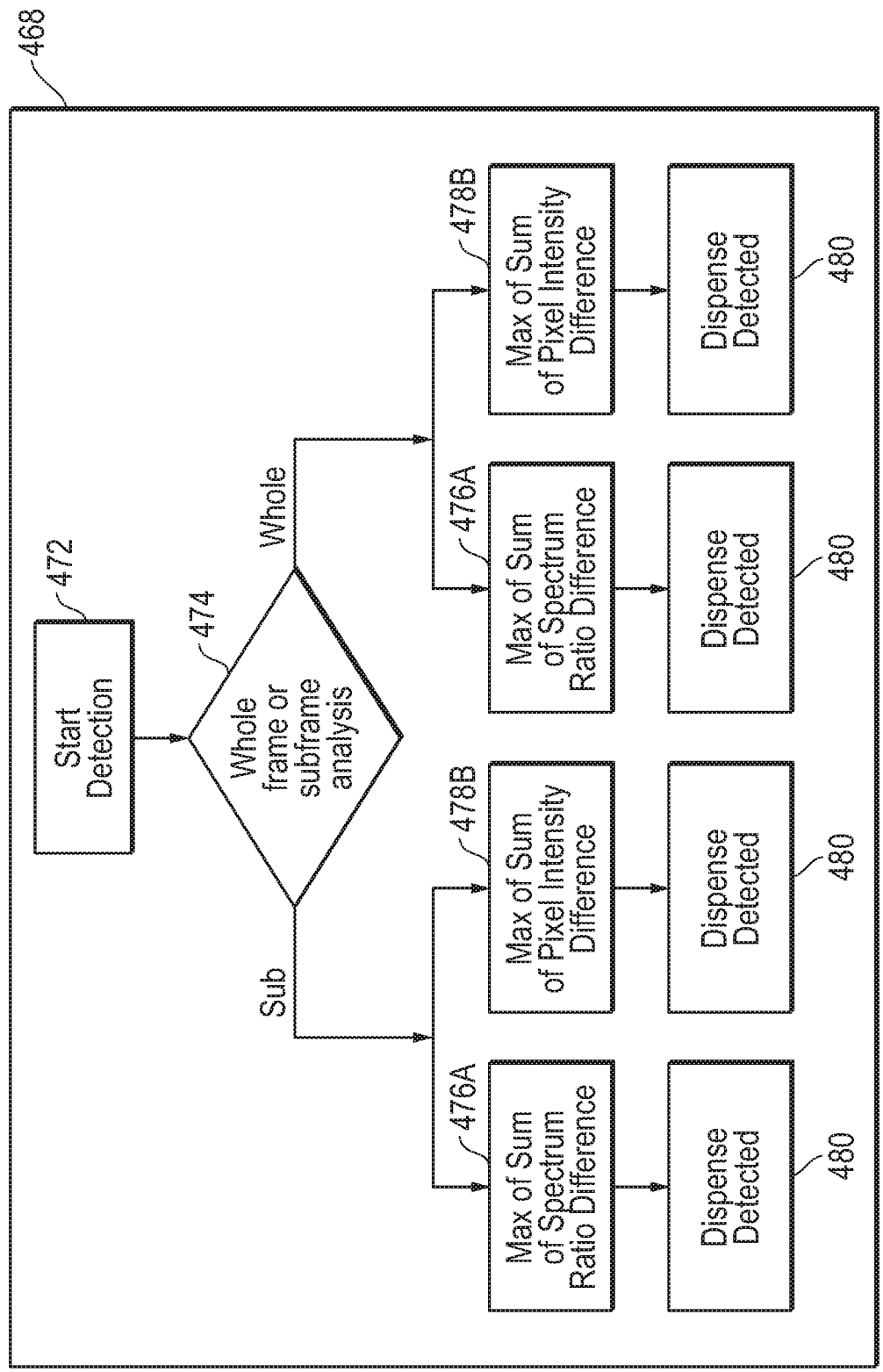

An exemplary workflow illustrating various potential ways that the detection analysis may proceed is shown in FIGS. 4F and 4G. The techniques of FIGS. 4F and 4G may be based wholly on arm movement (Case 1 of FIG. 4F), may be based on a combination of arm movement and direct detection of the fluid in the image (Case 2 of FIG. 4F), or may be based wholly on direct detection of the fluid in the image (Case 3 of FIG. 4F). In Case 1, arm movement is detected in step 450. The detected arm movement may be one or more of the various detected movements as indicated in steps 452, 454, 456, 458 and 460. For example, step 452 indicates detection of the arm moving into a frame. Step 454 indicates detection of the lateral movement stopping. Step 456 indicates detection of the arm movement down stopping. Step 458 indicates an optional detection of the arm moving and stopping at a second position, for example if a second dispense position is utilized. Step 460 indicates detecting the arm moving out of the frame. In one exemplary embodiment, the arm movement detection is determined from a maximum of summation of frame to frame pixel differences. The detection of any one or more of these arm movements may then be provided as an output 462 and used in the case 1 option 464 for provision to a dispense determination from arm movement step 466. Step 466 provides for determining a dispense detection based wholly from the arm movement detection step(s) utilizing an offset of frames from the particular arm movement detected to infer the start of the fluid flow. In one embodiment, the dispense start may be determined from step 456 which indicates the arm stopping and use of the time offset of the between movement stopping and the beginning of fluid flow known from the particular process recipe being utilized. As mentioned above, a second fluid dispense may be utilized and in one exemplary embodiment step 458 for detection of the arm moving and stopping at a second position may be utilized in the determining step 466.

Case 2 involves a combination of use of the arm movement detection step 450 and a dispense detected from fluid detection step 468. In case 2, the movement data provided at output 462 is utilized by the dispense detected from fluid detection step 468 as indicated by option 465 of the workflow. More particularly, the movement data is provided to narrow the time window in which frames are analyzed to look for an actual dispense start of the fluid flow. Thus, based upon the detection of one or more of the described arm movements, analysis of particular frames for dispense detection may occur. By using the arm movement to narrow the number of frames to be analyzed, the amount of data processing may be limited and the number of dispense detection errors may be reduced. The dispense detected from fluid detection step 468 may be performed in any of a wide variety of ways of analyzing the images obtained from the camera. An exemplary workflow of several exemplary embodiments of step 468 is shown in FIG. 4G as discussed in more detail below.

Case 3 involves utilizing a dispense detected from fluid detection step 468 without using arm moving data as indicated by case 3 option 470 of the workflow of FIG. 4F. Thus, the workflow may directly move to step 468 of the figure. In such an approach, a wider range of frames to be analyzed (as compared to case 2) may be utilized. In this approach, the beginning of the frame analysis may be triggered by some other variable (such the beginning of the recipe, the loading of a substrate, etc.). Alternatively, a continuous monitoring for dispense may always be occurring.

Exemplary embodiments of the dispense detected from fluid detection step 468 are shown in the workflow of FIG. 4G. As shown in FIG. 4G, the process starts at start detection step 472. Step 472 may start be looking at frames triggered from the arm movement as mentioned above when describing case 2. Step 472 may alternatively be occurring continuously (or triggered by some other event) as described in case 3 above. A decision step 474 may then be performed. More particularly, the workflow may proceed on an analysis of a whole frame as an analysis window or proceed on an analysis of a sub frame (for example some selected pixels) as an analysis window. It will be recognized that a workflow need not allow for both options and may be configured to proceed only on a whole frame or sub frame basis. Then, the particular data analysis technique utilized to analyze the frames may be performed. Steps 476A and 478B provide exemplary data analysis techniques, however it will be recognized that other techniques may be utilized. For example as shown in steps 476A a maximum sum of spectrum ratio. differences (as described above) may be performed. Alternatively, as shown in steps 478B a maximum sum of pixel intensity differences (as described above) may be performed. The dispense detected frame may then be provided at steps 480. Though the workflow of FIG. 4G illustrates the analysis techniques of either step 476A or 478B being utilized individually, it will be recognized that a workflow may utilize both detection techniques together to provide a dispense detection.

Dispense Puddle/Edge Detection

Figure 5:
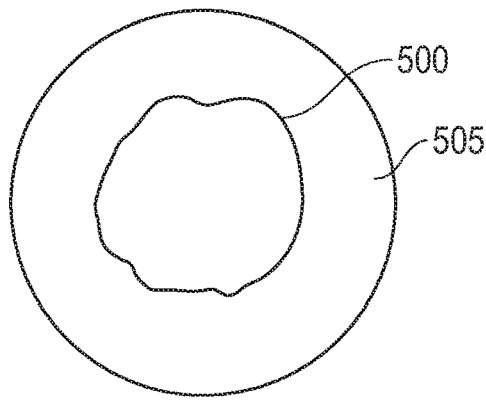
FIG. 5 illustrates a dispense puddle formed on a substrate.

In another analysis embodiment utilizing camera 90, the edge of the fluid as it is detected on the substrate may be detected. In one example, the detected edge may be the original puddle formed by the dispense prior to spinning the substrate. In another embodiment, the edge may represent the puddle as it is spread during spinning. FIG. 5 illustrates an example image of a puddle 500 formed upon a substrate 505. It will be recognized that though FIG. 5 illustrates a center top camera image, the image may be obtained from any of a wide variety of camera placements. It will also be understood that the puddle 500 may be formed of any of a wide variety of materials that are deposited upon a substrate to form a puddle. The image obtained may be analyzed to detect intensity, color and/or greyscale differences or gradient differences across the substrate due to differences between the exposed substrate areas and areas of the substrate covered by the puddle. This information may be utilized so as to determine the edges of the puddle 500 of material that is deposited on the substrate. The image analysis may be performed upon one static image (for example after dispense but immediately before spin). Alternatively, the image analysis of the puddle may occur dynamically over a period of time by analyzing a video or multiple still images (including images obtained during spinning of the substrate).

The dispense edge detection provides a method to analyze a dispense recipe and the associated fluid coverage through time. During a process in which fluid is applied to a substrate, the substrate may spin to move the fluid outward to cover the substrate. The spinning of the substrate may occur before, during, or after the dispense of the fluid starts and may change speed at which it spins throughout the recipe. As the substrate spins, the dispense edge detection techniques provide a way to measure how much of the substrate is covered at any point in time. Detection of the dispense edge may also be used to provide feedback to the fluid dispense system and help determine how effective the dispense process is.

The dispense edge detection technique may use a variety of detection and data processing methods, including some that are used to detect the dispense start frame. In one embodiment, first the dispense recipe is identified and the appropriate frames determined to be used for analysis. For example, in order to find the start of the recipe the arm movement into the field of view, the movement downwards toward the substrate, and the end of the downward movement may be detected as discussed above. Once the end of the downward movement is detected, a predetermined set of pixels may be used to search for the initial dispense on the substrate based on the maximum intensity change.

From the start of the dispense on the substrate of the fluid, the initial outline and outer edge of the fluid on the substrate may be found by analyzing the intensity change across the substrate over time. Once the outer edge of the dispense is found, a shape may be fit to track the movement outwards throughout the recipe based on the camera angle (for example a circular puddle of fluid on the substrate will not have a circular image pattern if the camera is located in a corner of the fluid dispense system). Similar to a series of circles with varying radii, multiple iterations of the previously determined shape may be fitted moving outward from the initial dispense to the edge of the wafer. It may then be determined which pixels fall within a given iteration of the shape but not within any of the other iterations. Then for each frame in the recipe after the dispense is detected, the intensity may be calculated for each set of pixels within each shape iteration. In one embodiment, the intensity difference is calculated for each frame and a possible threshold or filters may be used to ignore certain intensity differences. For the set of pixels calculated from the intensity difference, it is then determined which shape iteration each of these pixels fall within. This may then be used to detect the edge of the dispense for the current frame in the recipe. Once the edge is detected for each frame in the recipe, the number of pixels within each puddle detected for each frame may be calculated. In addition, the ratio of the number of pixels within each edge and total number of pixels within the substrate may be calculated. This calculation gives insight into the coverage of the substrate throughout the recipe and the coverage rate of change. It will be recognized that other calculations may also be utilized to characterize the edge of the fluid on the substrate.

One exemplary embodiment of a workflow for tracking the puddle edge may thus be as follows. First, the appropriate frames to analyze from the camera data are determined. This determination may be based upon the hardware movement detection and/or detection of the dispense start as described above. Thus, the analysis may be focused on the relevant frames proximate in time to the formation of the puddle. Second, the outer edge of the initial dispense edge is determined based on the intensity difference for a given set of pixels. Third, a shape is fit to the initial dispense puddle edge based on the camera angle. This shape is then used to track the puddle edge throughout the recipe. Fourth, throughout the recipe, multiple iterations of the shape are fit to the current frame moving outwards from the shape fit for the previous frame to the edge of the substrate. For example if a circle was fit to the initial puddle, multiple circles with each having a slightly larger radius than the previous, would be fit to the current frame. Fifth, the difference is calculated for each frame and the edge is found from the maximum number of points that fall within a given ring or area of the multiple iterations of the shape. In one embodiment, filtering of the data may be applied before the intensity difference analysis so as to limit the amount of data that needs processing. Without filtering, the amount of data present makes fitting the data more difficult. Furthermore, in one embodiment only fitting of the outer most data points of the puddle is performed to further enhance the accuracy and speed of the calculations. In addition, filtering of data points and shapes may further be based on tracking fits for previous frames and the rate of puddle expansion over time.

Spin Speed Determinations and Synchronization with Camera Data

In another embodiment, the spin speed of a substrate on the spin chuck 64 within the fluid dispense system 60 may be determined. Further, the spin speed may be affiliated with each frame obtained from the camera 90. This data is useful because the synchronization of the spin motor to the dispense system is beneficial to maintaining a consistent film thickness and uniformity between substrates. More specifically, film uniformity is controlled by (and very sensitive to) changing the rotation rate at different times in the coating process. Correlating the dispense start and the spin speed thus provides valuable information for controlling the film coating process of the fluid dispense system 60. For example, having a metric for the delay between fluid hitting the substrate and the change in spin speed is important. Further, the delay between the last of the dispensed fluid hitting the substrate and a change in spin rotation rate would also be valuable. It will be recognized that other information correlating the dispense process and the spin speed would be valuable, including for example relating the spin speed at a particular frame to puddle information obtained from that frame.

The spin speed affiliated with a particular frame obtained from the camera may be obtained using a variety of techniques. In one embodiment, the camera data itself is utilized to obtain the spin speed. More specifically a camera video image may be obtained from the camera 90 and the spin speed may be obtained from the video image. In one embodiment of using the camera data, the spin speed may be obtained from the video image by detecting the difference of the orientation of a pattern on a spinning substrate over time. The camera data may monitor the pattern on the substrate and as the substrate rotates detection of the rotation speed may be obtained. For example, the intensity difference (grey scale or chosen color wavelengths) between frames over some chosen area of pixels can be monitored. No change may indicate that the substrate is not spinning. While the substrate spins the cyclical change in the intensity may represent the spinning speed. This data may be obtained for each frame and thus the exact frame in the video that the rotation rate of the wafer is changing may be obtained.

An alternative method, the spin speed may be obtained from a signal from the spin motor and this data at a particular point in time may be affiliated with a particular frame obtained from the camera. For example, the motor signal from the spin motor may be linked to the camera data. This linkage could be done by connecting the motor signal to a display in the field of view of the camera 90 or by coupling the motor signal to the controller 94 which also receives the camera data. In one embodiment, the motor signal could interlace the camera data with the motor signal (i.e. like closed captioning) to produce an altered video output from which both sets of information can be extracted by the controller 94. It will be recognized that the linkage of the motor signal and the camera data may also be performed by another controller separate from the fluid dispense system 60 as the techniques described are not limited to being accomplished by a particular controller or data processing system.

It will be recognized that the substrates described herein may be any substrate for which the substrate processing is desirable. For example, in one embodiment, the substrate may be a semiconductor substrate having one or more semiconductor processing layers (all of which together may comprise the substrate) formed thereon. Thus, in one embodiment, the substrate may be a semiconductor substrate that has been subjected to multiple semiconductor processing steps which yield a wide variety of structures and layers, all of which are known in the substrate processing art, and which may be considered to be part of the substrate. For example, in one embodiment, the substrate may be a semiconductor wafer having one or more semiconductor processing layers formed thereon. Although the concepts disclosed herein may be utilized at any stage of the substrate process flow, the monitoring techniques described herein may generally be performed before, during or after a substrate is subject to a fluid dispense operation.

FIGS. 6-9 illustrate exemplary methods for use of the processing techniques described herein. It will be recognized that the embodiments of FIGS. 6-9 are merely exemplary and additional methods may utilize the techniques described herein. Further, additional processing steps may be added to the methods shown in the FIGS. 6-9 as the steps described are not intended to be exclusive. Moreover, the order of the steps is not limited to the order shown in the figures as different orders may occur and/or various steps may be performed in combination or at the same time.

Figure 6:
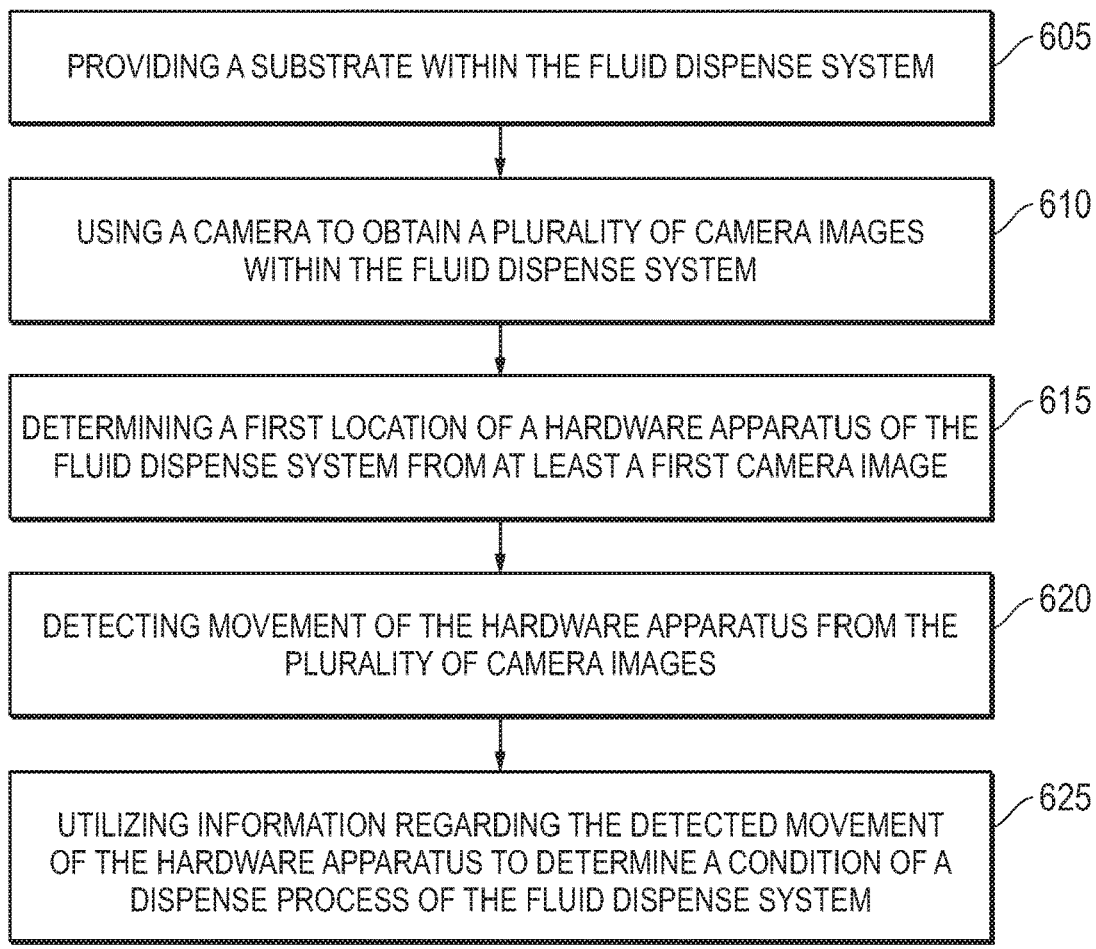
FIGS. 6-9 illustrate methods for utilizing exemplary embodiments of the techniques described herein.

FIG. 6 illustrates an exemplary method of monitoring one or more characteristics of a fluid dispense system. The method includes step 605 of providing a substrate within the fluid dispense system. The method also includes step 610 of using a camera to obtain a plurality of camera images within the fluid dispense system. The method also includes step 615 of determining a first location of a hardware apparatus of the fluid dispense system from at least a first camera image. The method further includes step 620 of detecting movement of the hardware apparatus from the plurality of camera images. The method finally includes step 625 of utilizing information regarding the detected movement of the hardware apparatus to determine a condition of a dispense process of the fluid dispense system.

Figure 7:
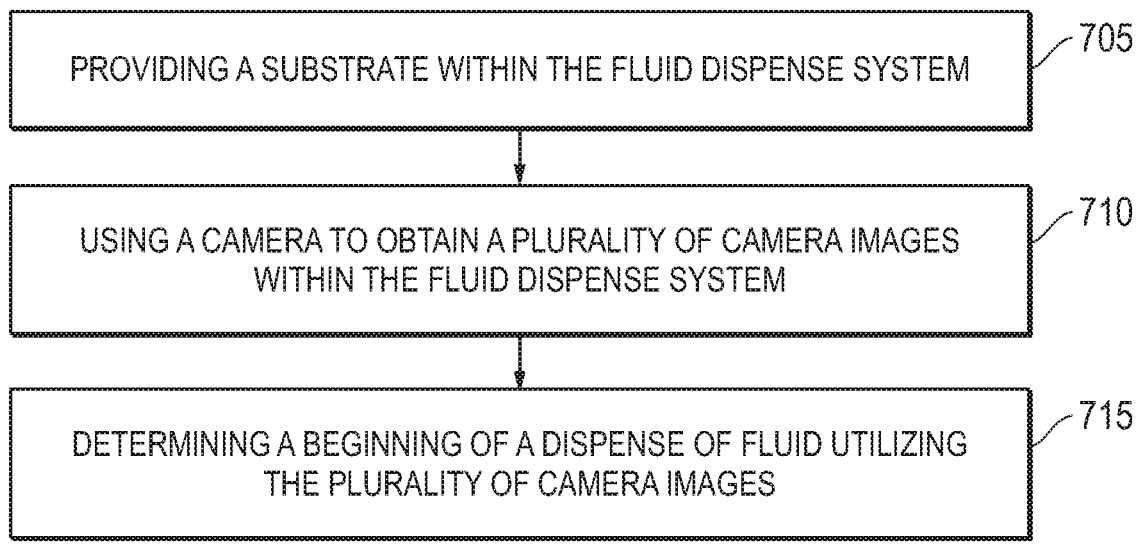

FIG. 7 illustrates another exemplary method of monitoring one or more characteristics of a fluid dispense system The method includes step 705 of providing a substrate within the fluid dispense system, step 710 of using a camera to obtain a plurality of camera images within the fluid dispense system, and step 715 of determining a beginning of a dispense of fluid utilizing the plurality of camera images.

Figure 8:
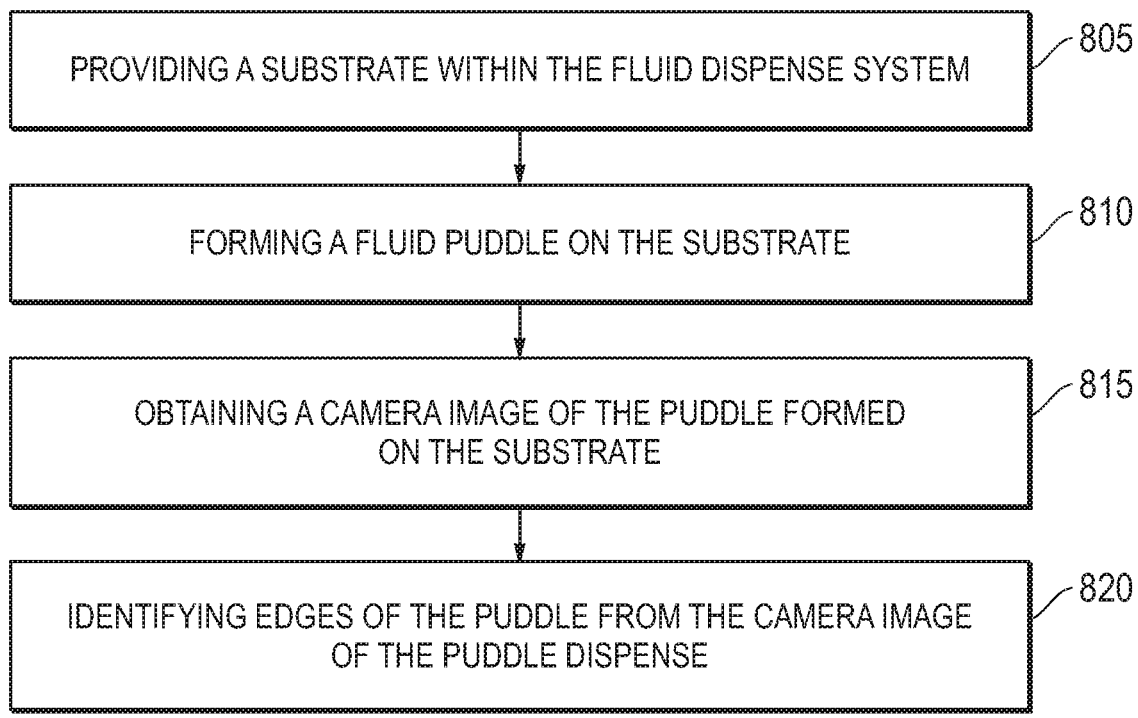

FIG. 8 illustrates yet another exemplary method of monitoring one or more characteristics of a fluid dispense system. The method includes step 805 of providing a substrate within the fluid dispense system. The method also includes step 810 of forming a fluid puddle on the substrate and step 815 of obtaining a camera image of the puddle formed on the substrate. Finally, the method includes step 820 of identifying edges of the puddle from the camera image of the puddle.

Figure 9:
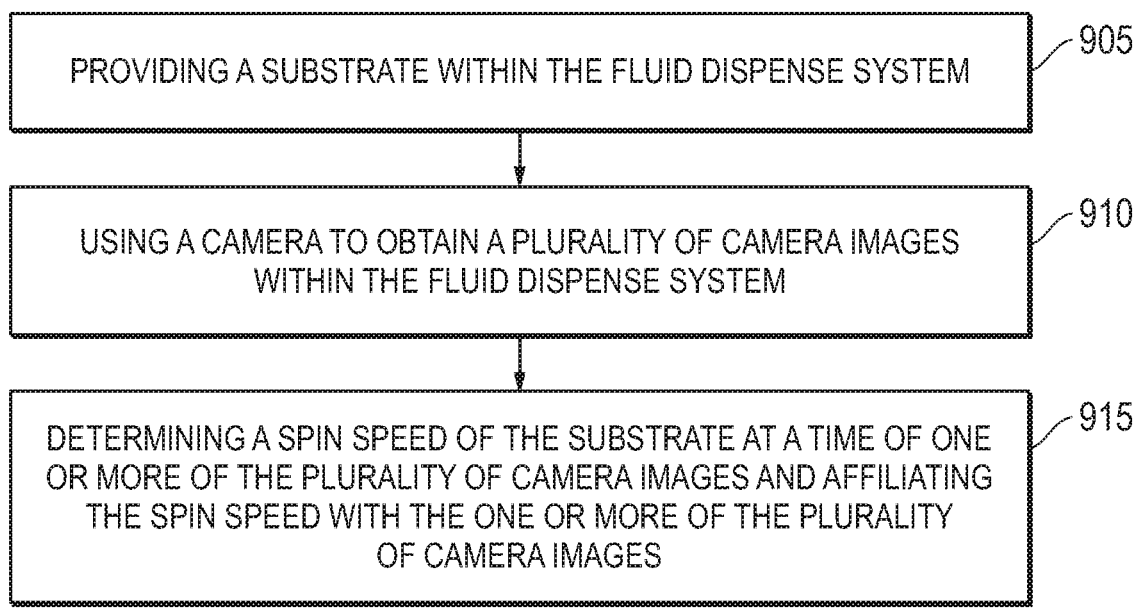

FIG. 9 illustrates still another method of monitoring one or more characteristics of a fluid dispense system. The method includes step 905 of providing a substrate within the fluid dispense system and step 910 of using a camera to obtain a plurality of camera images within the fluid dispense system. The method also includes step 915 of determining a spin speed of the substrate at a time of one or more of the plurality of camera images and affiliating the spin speed with the one or more of the plurality of camera images.

Further modifications and alternative embodiments of the inventions will be apparent to those skilled in the art in view of this description. Accordingly, this description is to be construed as illustrative only and is for the purpose of teaching those skilled in the art the manner of carrying out the inventions. It is to be understood that the forms and method of the inventions herein shown and described are to be taken as presently preferred embodiments. Equivalent techniques may be substituted for those illustrated and described herein and certain features of the inventions may be utilized independently of the use of other features, all as would be apparent to one skilled in the art after having the benefit of this description of the inventions.

What is claimed is:

1. A method of monitoring one or more characteristics of a fluid dispense system, the method comprising:
   providing a substrate within the fluid dispense system;
   using a camera to obtain a plurality of camera images within the fluid dispense system; and
   determining a beginning of a dispense of fluid utilizing the plurality of camera images, the determining based on determining differences in intensities between the plurality of camera images, wherein determining the differences in the intensities comprises
      determining, in a first image of the plurality of camera images, a first ratio of intensities of a first color spectrum to a second color spectrum different from the first color spectrum,
      determining, in a second image of the plurality of camera images, a second ratio of intensities of the first color spectrum to the second color spectrum, and
      comparing the first ratio with the second ratio.

2. The method of claim 1, wherein the first color spectrum comprises a red color spectrum, a blue color spectrum, or a green color spectrum, and the second color spectrum comprises the red color spectrum, the blue color spectrum, or the green color spectrum.

3. The method of claim 1, wherein the determining is performed by identifying in at least one of the plurality of camera images a presence of the fluid.

4. The method of claim 3, wherein the presence of the fluid is detected based on the determined differences in the intensities.

5. The method of claim 4, wherein the differences in the intensities is performed upon a predetermined set of pixels of the plurality of camera images.

6. The method of claim 4, wherein determining the differences in the intensities further comprises
   determining, in the first image of the plurality of camera images, a third ratio of intensities of the first color spectrum to a third color spectrum different from the first and the second color spectrums,
   determining, in the second image of the plurality of camera images, a fourth ratio of intensities of the first color spectrum to the third color spectrum, and
   comparing the third ratio with the fourth ratio.

7. The method of claim 1, wherein the determining is performed by analyzing movement of a hardware apparatus of the fluid dispense system.

8. The method of claim 7, wherein the determining is further performed by analyzing intensity changes over time within the plurality of camera images.

9. The method of claim 7, wherein the determining is further performed by identifying in at least one of the plurality of camera images a presence of the fluid based on an intensity analysis of the plurality of camera images.

10. The method of claim 1, wherein the fluid dispense system comprises an arm, a nozzle holder, and/or a nozzle.

11. The method of claim 1, wherein the plurality of camera images are provided from a video obtained by the camera.

12. A method of monitoring one or more characteristics of a fluid dispense system, the method comprising:
   using a camera to obtain a plurality of camera images of a substrate disposed within the fluid dispense system, the camera being located at a camera angle to the substrate;
   dispensing fluid onto the substrate with the fluid dispense system, the dispensing beginning by forming an initial puddle comprising the fluid on the substrate; and
   determining an edge of the fluid on the substrate from the plurality of camera images, the determining comprising
      determining an outer edge of the puddle by analyzing intensity changes across the substrate over time,
      fitting a shape based on the camera angle, and
      updating the shape to track an outward movement of the edge of the fluid as the initial puddle expands across a surface of the substrate, wherein determining the outer edge of the puddle by analyzing intensity changes across the substrate over time comprises
      determining, in a first image of the plurality of camera images, a first ratio of intensities of a first color spectrum to a second color spectrum different from the first color spectrum,
      determining, in a second image of the plurality of camera images, a second ratio of intensities of the first color spectrum to the second color spectrum, and
      comparing the first ratio with the second ratio.

13. The method of claim 12, wherein determining the outer edge of the puddle by analyzing intensity changes across the substrate over time further comprises
   determining, in the first image of the plurality of camera images, a third ratio of intensities of the first color spectrum to a third color spectrum different from the first and the second color spectrums,
   determining, in the second image of the plurality of camera images, a fourth ratio of intensities of the first color spectrum to the third color spectrum, and
   comparing the third ratio with the fourth ratio.

14. The method of claim 12, wherein the first color spectrum comprises a red color spectrum, a blue color spectrum, or a green color spectrum, and the second color spectrum comprises the red color spectrum, the blue color spectrum, or the green color spectrum.

15. The method of claim 12, wherein the differences is performed upon a predetermined set of pixels of the plurality of camera images.

16. The method of claim 12, wherein the plurality of camera images are provided from a video obtained by the camera.

17. A method of monitoring one or more characteristics of a fluid dispense system, the method comprising:
- spinning a spin chuck holding a substrate while dispensing fluid onto the substrate;
- using a camera to obtain a plurality of camera images of the spinning substrate; and
- determining a spin speed of the spin chuck while dispensing the fluid utilizing the plurality of camera images, the determining based on determining differences in intensities of an area of pixels between the plurality of camera images.

18. The method of claim 17, wherein determining the differences in the intensities comprises
- determining, in a first image of the plurality of camera images, a first ratio of intensities of a first color spectrum to a second color spectrum different from the first color spectrum,
- determining, in a second image of the plurality of camera images, a second ratio of intensities of the first color spectrum to the second color spectrum, and
- comparing the first ratio with the second ratio.

19. The method of claim 18, wherein determining the differences in the intensities further comprises
- determining, in the first image of the plurality of camera images, a third ratio of intensities of the first color spectrum to a third color spectrum different from the first and the second color spectrums,
- determining, in the second image of the plurality of camera images, a fourth ratio of intensities of the first color spectrum to the third color spectrum, and
- comparing the third ratio with the fourth ratio.

* * * * *